H. M. THRELKELD.
COMPUTING SCALE.
APPLICATION FILED JULY 14, 1914.

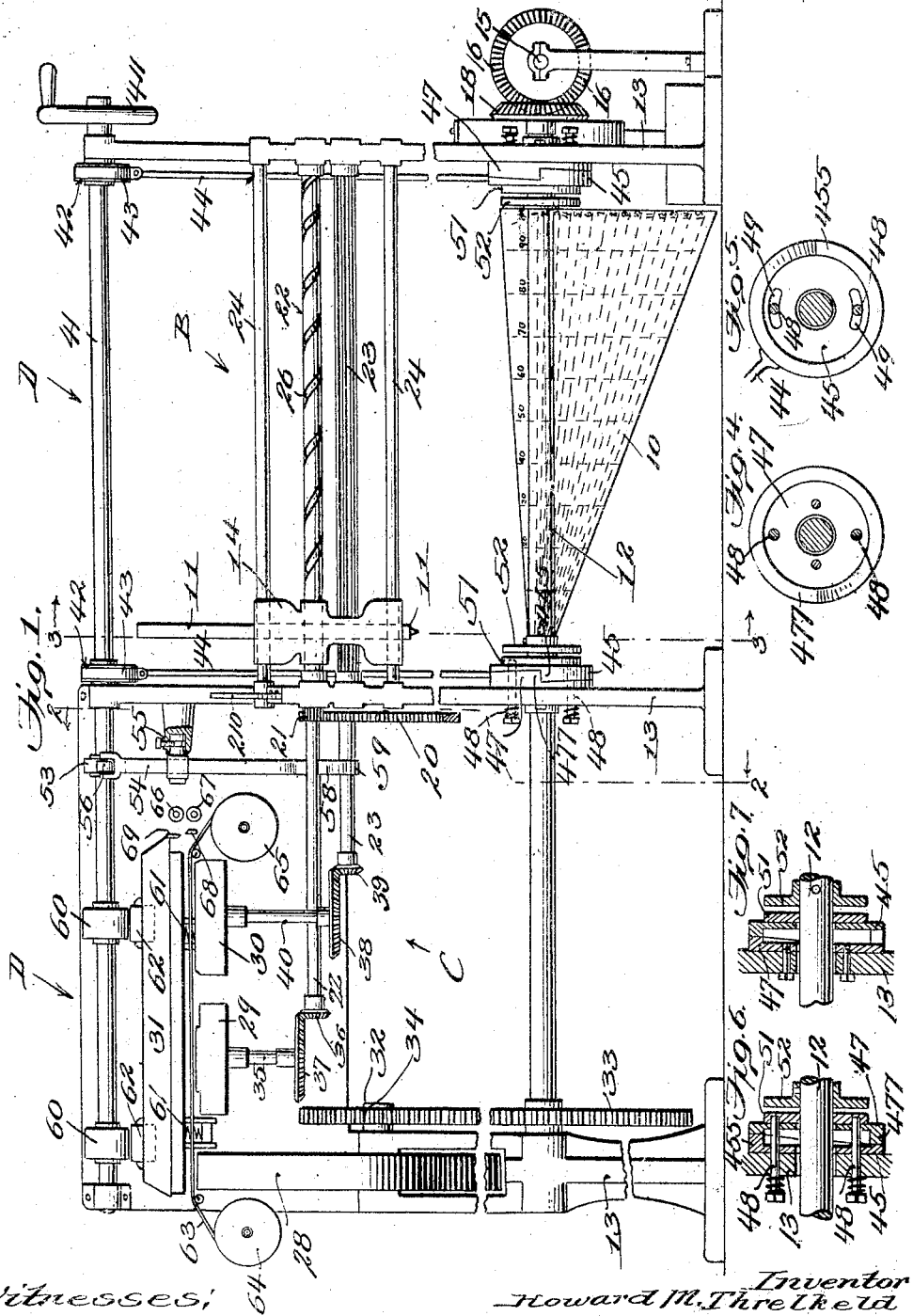

1,186,452.

Patented June 6, 1916.
2 SHEETS—SHEET 2.

Witnesses:

Inventor
Howard M. Threlkeld
by
James L. Norris,
Attorney.

UNITED STATES PATENT OFFICE.

HOWARD M. THRELKELD, OF PHOENIX, ARIZONA, ASSIGNOR OF ONE-HALF TO WIN WYLIE, OF PHOENIX, ARIZONA.

COMPUTING-SCALE.

1,186,452.

Specification of Letters Patent.

Patented June 6, 1916.

Application filed July 14, 1914. Serial No. 850,972.

*To all whom it may concern:*

Be it known that I, HOWARD M. THRELKELD, a citizen of the United States, residing at Phoenix, in the county of Maricopa and State of Arizona, have invented new and useful Improvements in Computing-Scales, of which the following is a specification.

The present invention has reference to computing scales, and, in particular, to that class or type of scale in which mechanism is utilized both for indicating or registering the cost or price of the commodities weighed upon the scale platform and for recording such cost or price upon a suitable record blank. It proposes certain improvements, hereinafter described at length, in or relating to the registering and recording devices proper, and the means or mechanism for actuating the same, to the end, generally, of providing a simplified apparatus of the character specified which will be readily attachable to any of the conventional makes of automatic scale in use, and which will operate from and in conjunction with the mechanism of the scale to produce a complete and accurate record of each weighing.

An embodiment of the invention is illustrated in the accompanying drawing, whereof:—

Figure 3:
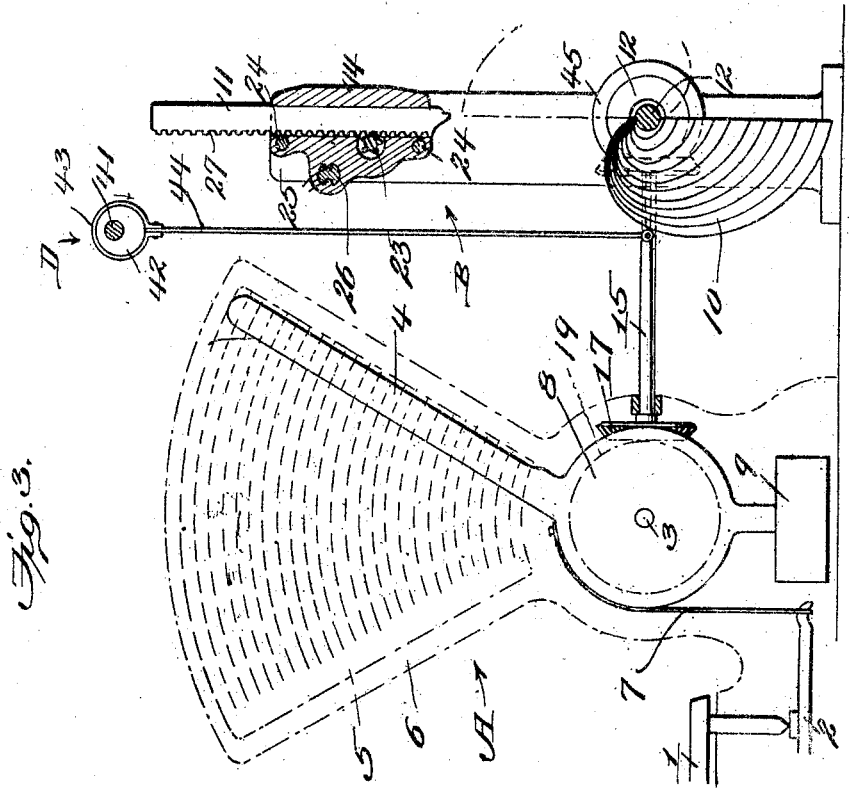
Figure 2:
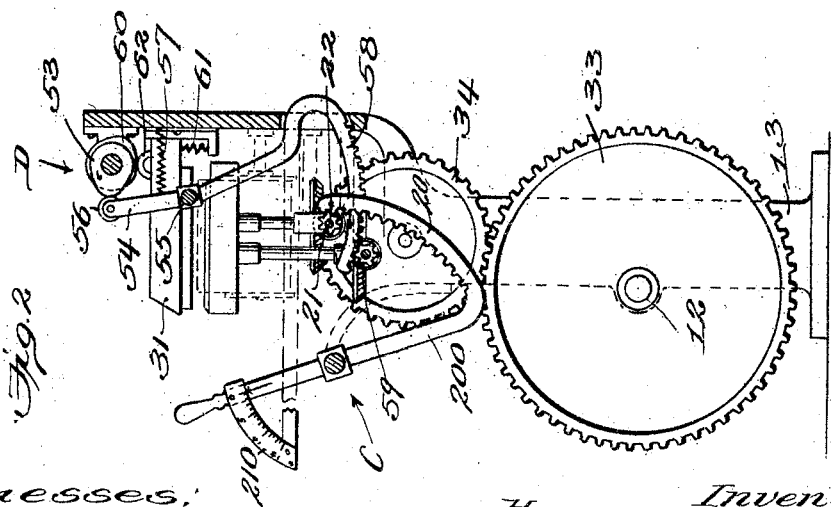

Figure 1 is a front elevation, with parts in section, of the improved registering and recording attachment; Figs. 2 and 3 are transverse vertical sections on the lines 2—2 and 3—3, respectively, of Fig. 1, the scale to which the attachment is applied being represented diagrammatically in Fig. 3; Figs. 4 and 5 are face views of the fixed and movable members of one of the locking devices employed; and Figs. 6 and 7 are vertical and horizontal sections taken centrally through said device.

Referring to said drawings, A indicates, generally, the scale proper, and B and C the registering and recording mechanisms, which, with the operating mechanism D, comprise the attachment constituting the invention. The scale A is of the conventional, automatic type now in use, and, hence, requires no extended description, beyond the fact that it includes the following main instrumentalities, to wit: the platform 1, the beam 2, the shaft 3 to which is secured the pointer 4, that travels across the graduated card 5 contained in the housing 6, and the strap or other flexible connection 7 between the said beam and the enlarged head 8 of the pointer, the arrangement being such that the depression of the beam, due to the weight of the material on the platform, serves to produce the requisite movement of the pointer through the intermediation of the strap. To return the parts to normal position, a suitable weight lever 9 is attached to the pointer head.

In the construction illustrated, which, for present purposes may be considered as preferred, the registering mechanism B is shown as consisting, primarily, of a graduated, rotatably-mounted body 10 and a coöperative pointer 11. The first of these parts is in the form of a hollow, conical shell which is approximately spiral in cross-section, and is secured along one edge to a horizontal shaft 12. This shaft is supported in suitable standards 13 constituting part of the frame-work of the apparatus, and is situated beneath, and co-planar with, the pointer 11, the latter being disposed vertically and mounted for endwise movement in a traveling carriage 14. The aforesaid shaft 12 has a suitable transmission connection with the scale shaft 3, here shown as embodying a horizontal shaft 15, provided at opposite ends with bevel gears 16 and 17 which mesh, respectively, with a gear 18 on the outer end of shaft 12 and with the gear teeth 19 formed on the beveled edge of the pointer head 8. Consequently, when the scale shaft is rotated, due to the descent of the platform and beam, such rotation will be transmitted to shaft 15, and thence to the shaft 12 of the registering mechanism, hereinafter termed the registering shaft, with the result that the position of the computing cone 10 is correspondingly adjusted. In this connection, it may here be stated that the graduations on the said cone are arranged in two series of parallel columns which extend both lengthwise and crosswise thereof and intersect each other at right angles, the figures at the heads of the lengthwise columns denoting in the present instance, the numbers of pounds and fractions thereof and those at the heads of the crosswise columns the prices per pound or fraction thereof.

The pointer 11, as above stated, is mounted in the carriage 14, the movement of which determines the position of said pointer relative to the cross-wise or transverse columns of the computing cone, and at the completion of such movement, the pointer is lowered until its end contacts with the surface of said cone, thus indicating the figures thereon from which the total is to be computed, (i. e., the cost of a given quantity of material,—that is to say, the quantity of material on the scale platform,—at a predetermined cost per pound). The movement of the carriage is preferably effected automatically consequent upon the adjustment of the price-setting element of the attachment, which element may take any convenient form, according to the make of the frame with which the attachment is used. In the representation shown, said element is formed as a centrally-fulcrumed lever 200 supported from the frame and having its lower end provided with an arcuate rack 20, and its upper arm coöperating with a price-indicating scale 210. The said rack 20 actuates a pinion 21 secured to a horizontal shaft 22 that is journaled in the central and right-hand standards 13, and is situated above a toothed shaft 23, the carriage having openings through which pass the two shafts 22 and 23, and, also, a pair of guide rods 24, arranged one above and the other below said shafts and parallel therewith, both the said shafts and the guide rods being disposed above the computing cone. The opening in the carriage through which the shaft 22 projects, is provided with a pair of keys 25 that extend into a rifled or spiral groove 26 in said shaft, and, in consequence, during the rotation of said shaft, the carriage will be caused to move toward either end of the shaft, according to the direction of such rotation. Normally, however, the carriage occupies a position directly above the smaller or left-hand end of the cone, which may, therefore, be considered its zero position, so that the initial rotation of shaft 22 will cause the carriage to move toward the right, it being understood that such rotation is produced through the agency of the parts 20 and 21 when the former is manipulated to adjust the mechanism in accordance with the current price of the particular commodity being sold.

The downward movement of the pointer 11 may advantageously be produced by forming a vertical series of rack teeth 27 upon the back of said pointer, which teeth mesh with the long teeth formed upon the shaft 23, the latter being equivalent, therefore, to an elongated pinion. The rotation of this shaft is preferably accomplished by means of the operating mechanism D, as subsequently explained.

The recording mechanism C is designed to operate upon a paper strip or ribbon, (illustration of which, however, is omitted as being unnecessary to the disclosure), and in its preferred form comprehends devices for printing upon such strip or ribbon the weight of the quantity of material upon the scale platform, the price of said material per pound or fraction thereof, and the computed cost of such quantity at such price. Separate drums or other type-carrying elements 28, 29 and 30 for printing the three items may advantageously be employed, which are set in the manner hereinafter described, and in connection therewith a single platen or impression element 31 actuatable by the operating mechanism. The first of these drums, i. e., that which serves to print the weight, is mounted on the left-hand standard 13, upon a short horizontal shaft 32, and is disposed beneath the adjacent end of the platen. This drum is driven from the registering shaft 12, and, hence, is set or adjusted simultaneously with cone 10, the said shaft 12 being extended for such purpose, to the said left-hand standard and provided with a gear 33 that meshes with and drives a gear 34 on the drum shaft.

The second drum 29 is employed to print the price and is set by the actuation of the rack 20, or equivalent price-setting element of the scale, through the agency of the pinion 21. The rifled shaft 22 carrying said pinion is likewise extended beyond the central standard 13 and is connected with the vertical shaft 35, whereon said drum is mounted, through the agency of the intermeshing bevel gears 36 and 37, so that the manipulation of the element 20 for the purpose of setting the scale in accordance with the current price of the material being weighed serves, also, to automatically and simultaneously set said drum. The third drum 30 is designed to print the computed cost, and is operated from the pinion shaft 23 by means of intermeshing bevel gears 38 and 39, the latter of which is fixed to the said pinion shaft and the former to the vertical drum shaft 40, the two shafts 35 and 40 being supported in any suitable manner. The last-mentioned shaft, however, is actuated directly from the operating mechanism D, as explained later, so that the drum 30 is not set until the adjustment or setting of the computing cone 10 and the drums 28 and 29 has been completed.

The actuation of the operating mechanism D takes place, as previously stated, after the weighing operation has been concluded and the adjustment or setting of the computing cone 10, the pointer carriage 14, and the drums 29 and 30 has been terminated. This mechanism, in its preferred form, consists, as shown, of a horizontal shaft 41 which is journaled in bearings provided in the upper ends of the standards 13 and carries a series of cams, rotation of said shaft being effected by any suitable means, as, for example, the handle 411. The aforementioned cams are utilized to successively actuate the devices which lock the computing cone in adjusted position, to produce the rotation of the pinion shaft 23, which, in turn, lowers the pointer 11 into contact with said cone and sets the computing drum 30, and to depress the platen 31. These actions take place during the first half-revolution of the operating shaft, and as the latter completes its revolution the order is reversed, the last action being the unlocking of the cone.

Referring more particularly to Figs. 1 and 3, the two cams or eccentrics 42 disposed above the registering mechanism on the shaft 41 are each shown as provided with a strap 43, which is connected by a rod 44, or the like, with the movable member 45 of the corresponding locking device, so that during the initial rotation of shaft 41, the said members 45 will be rotated. Each member 45 is here shown as in the form of a disk having a clutch tooth or shoulder 455 on its inner face, and as having associated with it a complemental disk 47 which is fixed to the adjacent standard 13 and is likewise toothed upon its inner face, as at 477, the arrangement being such that when the members 45 are rotated, they are simultaneously forced laterally along shaft 12, the latter and the pins or other fastening devices 48 passing through suitable arcuate guide slots 49 with which member 45 is provided. Upon its back, or outer face, each member 45 carries a friction pad or plate 51, which is designed to engage a friction plate or disk 52 fixed on shaft 12, in consequence whereof the outward movement of the members 45 and the resultant engagement of their friction elements 51 with the friction elements 52 serve to hold the cone 10 against movement, the two eccentrics having a counterpart arrangement which enables them to act in unison.

The third cam 53 on shaft 41 is utilized to control operation of the device which produces the rotation of the pinion shaft 23, and as represented in Fig. 2, said device embodies, in the present instance, a lever 54 having a rocking mounting 55 intermediate its ends and being provided at its upper end with a roller 56 which is normally held against said cam by the action of a spring 57. The lower end of said lever is formed with an arcuate, rack-like extension 58, the teeth of which mesh with those of a pinion 59, so that during the rocking movement of the lever incidental to the rotation of shaft 41, such movement will be transmitted to shaft 23. Rotation of the shaft 41 will turn the cam 53 thereon in a direction to allow the spring 57 to actuate the lever 54 to cause lowering of the pointer 11 and setting or adjustment of the computing drum 30, further rotation of said shaft causing the cam 53 to raise or return the pointer to initial position.

The two remaining cams 60 are arranged to depress the platen 31, the latter being normally held in raised position by a suitable spring or springs 61. These cams are disposed directly above a pair of rollers 62, which are rotatably mounted on the body of the platen, and are in constant engagement with the same, as will be understood from Figs. 1 and 2. As represented in the former figure, there is an appreciable space, under normal conditions, between the tops of the drums 28, 29 and 30 and the bottom of the platen, and through this space are passed the paper strip, (not shown), and its inking ribbon 63, or equivalent, the said ribbon being connected at its ends to a pair of spools 64 and 65 upon which it is alternately wound up. The rotation necessary to effect the winding operation, as also the feed of the paper strip, may be produced by or through the agency of, the movements of the platen, but as such operations form no part of the present invention, illustration of the instrumentalities necessary therefor is omitted. It may be stated, however, that the paper strip passes between a pair of feed rolls 66 and 67 to the space between the platen and the printing drums, and, at the completion of the printing or recording operation, is severed into ticket-like sections of suitable lengths by a device which may embody, for instance, fixed and movable knives 68 and 69 located a slight distance in front of the feed rolls, the second-named knife 69 being attached to the platen, so as to participate in its movements.

The complete operation is as follows:— The material to be weighed is placed upon the scale platform 1 which sinks in the usual manner and actuates the pointer 4, the price-setting element 200 having first been adjusted in accordance with the current price of the material, with the result that the rifled shaft 22 is rotated by pinion 21 and, in turn, positions the carriage 14 with respect to the computing cone 10 and sets the price-printing drum 29. The depression of the scale platform also produces the setting or rotary adjustment of the said cone, through the agency of the transmit ting shaft 15 and its gear connections with the scale and cone shafts, the rotation of the cone shaft serving to effect the setting of the weight-printing drum 28. The operating shaft 41 is then turned through one complete revolution, during the first half of which there take place in succession: the rotation of the movable disks 45 and consequent engagement of their friction members 51 with the friction members 52, to lock the computing cone in adjusted or set position; the rocking of the lever 54 which produces the descent of the pointer 11 into contact with the cone, and the setting of the total-printing or computing drum 30; the depression of the platen 31; and, finally, the severing of the paper strip. During the second half-revolution of the operating shaft, the platen first rises; the computing drum is returned to its initial or zero position, and the pointer 11 is caused to ascend; and the disks 45 are reversed and unlock the cone. The latter and the weight-printing drums 28 are returned to zero or initial position when the material is removed from the scale platform, and the pointer-carriage and the price-printing drum 29 are likewise caused to assume their respective initial positions simultaneously with the return of the price-adjusting element 200. The feed movement of the paper strip and the movement of the inking ribbon may take place at any time found suitable, while the severing of the strip occurs at the conclusion of the descent of the platen.

I claim:

1. In a computing scale, the combination with weighing mechanism; of means for computing the cost of materials weighed including a recording mechanism having separate means for printing the weight of the material weighed, its price, and its computed cost at such price; and a movable computing element actuated by the weighing mechanism and having a controlling surface for the recording mechanism shaped in directions parallel to and transversely of its direction of motion in accordance with different weights and prices.

2. In a computing scale, the combination with weighing mechanism; of means for computing the cost of materials weighed including a recording mechanism having means for printing the weight of the material weighed, its price, and its computed cost at such price; a rotatable member actuated by the weighing mechanism and having a peripheral surface generated circumferentially and axially according to different weights and prices to control the operation of the recording mechanism, and means operative after the weighing operation has been completed for actuating the recording mechanism.

3. In a computing scale, the combination, with weighing mechanism; of a registering mechanism embodying a rotatable computing cone having graduations thereon, and a movable pointer coöperative with said cone; connections between said weighing mechanism and said cone for operating the latter from the former; and means for moving said pointer into coöperative relation with different graduations on the cone.

4. In a computing scale, the combination, with weighing mechanism; of a registering mechanism embodying a rotatable computing cone and a movable pointer to coöperate with said cone; connections between said weighing mechanism and said cone for operating the latter from the former; and separate means for moving said pointer to and from engagement with the periphery of the cone, and also axially of said cone.

5. In a computing scale, the combination, with weighing mechanism; of a registering mechanism embodying a rotatable computing cone having graduations thereon, and a pointer located above said cone for coöperation therewith; connections between said weighing mechanism and said cone for operating the latter from the former; and separate means for moving said pointer endwise to and from engagement with the periphery of the cone, and laterally toward either end of said cone.

6. In a computing scale, the combination, with weighing mechanism; of a registering mechanism embodying a rotatably mounted computing element having intersecting transverse and longitudinal columns of figures thereon, and a movable pointer coöperative with said element; and connections between said weighing mechanism and said element for operating the latter from the former; said pointer being movable transversely to and from engagement therewith, and toward either end of said element.

7. In a computing scale, the combination, with weighing mechanism; of a registering mechanism embodying a rotatably mounted computing element operatively connected with the weighing mechanism; and having a peripheral surface generated circumferentially and axially in accordance with different weights and prices; a controlling member for the registering mechanism coöperative with said element; and mechanism operative subsequent to the completion of the weighing operation for successively locking said element in adjusted position and moving said member into coöperative relation with the same.

8. In a computing scale, the combination, with weighing mechanism; of a registering mechanism embodying a rotatably mounted computing element operatively connected with the weighing mechanism and having circumferential and axial graduations thereon, corresponding to different weights and prices; a controlling member for the registering mechanism coöperative with said element; and mechanism operative subsequent to the completion of the weighing operation for locking and unlocking said element subsequent to its adjustment and for moving said member to and from coöperative relation with said element in the interval between said locking and unlocking operations.

9. In a computing scale, the combination, with weighing mechanism, and an adjustable price-setting element associated therewith; of a registering mechanism embodying a rotatably mounted computing element operatively connected with the weighing mechanism and having circumferential and axial graduations thereon corresponding to different weights and prices, and a pointer operatively connected with said setting element for movement longitudinally with relation to said computing element when the former element is adjusted; and mechanism for subsequently moving said pointer toward the computing element.

10. In a computing scale, the combination, with weighing mechanism, and an adjustable price-setting element associated therewith; of a registering mechanism embodying a rotatably mounted computing element operatively connected with the weighing mechanism and having circumferential and axial graduations thereon corresponding to different weights and prices, and a pointer operatively connected with said setting element for movement longitudinally with relation to said computing element when the former element is adjusted; and mechanism for locking and unlocking said computing element subsequent to its adjustment and for moving said pointer toward the same in the interval between said locking and unlocking operations.

11. In a computing scale, the combination with weighing mechanism, of a recording mechanism embodying separate elements for printing the weight of the material weighed, its price, and its computed cost at such price, means for setting the price printing element to print a given price per unit of weight, computing means governed by the weighing mechanism and controlled according to the setting of the price printing element for operating the recording mechanism to compute the cost of the material according to its weight and its price per unit of weight, said computing means including a member having a surface shaped in accordance with different weights and prices, means governed by the action of the weighing mechanism for setting said weight printing element, means coöperative with the computing means for setting said cost printing element, and a platen coöperative with said printing elements.

12. In a computing scale, the combination, with a weighing mechanism, cost computing means including a price-setting element associated therewith; of a recording mechanism embodying separate elements for printing the weight of the material weighed, its price and its computed cost at such price, the weight-printing and price-printing elements being operatively connected with the weighing mechanism and the price-setting element for adjustment thereby, a platen common to and coöperative with all of said printing elements, and means for successively adjusting the cost-printing element and actuating the platen.

13. In a computing scale, the combination, with a weighing mechanism, cost computing means including a price-setting element associated therewith; of a recording mechanism embodying separate elements for printing the weight of the material weighed, its price and its computed cost at such price, the weight-printing and price-printing elements being operatively connected with the weighing mechanism and the price-setting element for adjustment thereby, means for adjusting the cost-printing element, a platen common to all of said printing elements, and an operating shaft having cams thereon for successively actuating the last-named adjusting means and the platen.

14. In a computing scale, the combination, with a weighing mechanism, and a price-setting element associated therewith; of a registering mechanism embodying an axially and circumferentially graduated computing element connected with the weighing mechanism for rotation thereby, a pointer coöperative with the computing element, a carriage whereon said pointer is mounted for endwise movement toward and from said computing element, connections between said setting element and said carriage for adjusting the position of the latter relative to said computing element, and means for moving said pointer into contact with said computing element subsequent to such adjustment.

15. The combination, with a weighing mechanism, and a price-setting element associated therewith; of a registering mechanism embodying a computing element connected with the weighing mechanism for rotation thereby, and having a peripheral surface shaped circumferentially and axially in accordance with different weights and prices and a pointer coöperative with the computing element and connected with the setting element for movement relative to said peripheral surface of the computing element when said setting element is operated; a recording mechanism embodying cooperative printing and impact elements, the former of which is connected with said setting element for adjustment by the same; and a common operating means for said registering and recording mechanisms adapted to successively move said pointer toward said computing element and to actuate said impact element.

In testimony whereof I have hereunto set my hand in presence of two subscribing witnesses.

HOWARD M. THRELKELD.

Witnesses:
H. M. CLEMENS,
S. J. KENYON.